United States Patent
Yamazaki

(10) Patent No.: US 7,493,448 B2
(45) Date of Patent: Feb. 17, 2009

(54) PREVENTION OF CONFLICTING CACHE HITS WITHOUT AN ATTENDANT INCREASE IN HARDWARE

(75) Inventor: Shinya Yamazaki, Tokyo (JP)

(73) Assignee: NEC Corporation (JP)

( * ) Notice: Subject to any disclaimer, the term of this patent is extended or adjusted under 35 U.S.C. 154(b) by 169 days.

(21) Appl. No.: 10/465,544

(22) Filed: Jun. 20, 2003

(65) Prior Publication Data

US 2003/0236947 A1    Dec. 25, 2003

(30) Foreign Application Priority Data

Jun. 24, 2002   (JP) ............................. 2002-182525

(51) Int. Cl.
    *G06F 12/00* (2006.01)
(52) U.S. Cl. .................. 711/128; 711/130; 712/203
(58) Field of Classification Search .......... 711/113–147
    See application file for complete search history.

(56) References Cited

U.S. PATENT DOCUMENTS

| | | | | |
|---|---|---|---|---|
| 5,325,504 A * | 6/1994 | Tipley et al. | ................. | 711/128 |
| 5,463,765 A * | 10/1995 | Kakuta et al. | ................. | 714/6 |
| 5,701,432 A * | 12/1997 | Wong et al. | ................. | 711/130 |
| 6,101,595 A * | 8/2000 | Pickett et al. | ................. | 712/205 |
| 6,295,580 B1 * | 9/2001 | Sturges et al. | ................. | 711/129 |
| 6,493,800 B1 * | 12/2002 | Blumrich | ................. | 711/129 |
| 6,574,708 B2 * | 6/2003 | Hayter et al. | ................. | 711/118 |
| 6,694,407 B1 * | 2/2004 | May et al. | ................. | 711/129 |

FOREIGN PATENT DOCUMENTS

| | | |
|---|---|---|
| JP | 52-141141 | 11/1977 |
| JP | 63-257853 | 10/1988 |
| JP | 2-294858 | 12/1990 |
| JP | 4-55959 | 2/1992 |
| JP | 4-100158 | 4/1992 |
| JP | 7-248967 | 9/1995 |
| JP | 9-101916 | 4/1997 |
| JP | 9-146842 | 6/1997 |
| JP | 10-232834 | 9/1998 |
| JP | 10-232839 | 9/1998 |
| JP | 10-293720 | 11/1998 |
| JP | 11-212869 | 8/1999 |
| JP | 11-509356 | 8/1999 |
| JP | 2000-259498 | 9/2000 |
| JP | 2001-282559 | 10/2001 |
| JP | 2001-282617 | 10/2001 |
| JP | 2002-116956 | 4/2002 |
| JP | 2002-140234 | 5/2002 |
| JP | 2002-342163 | 11/2002 |
| JP | 2002-373115 | 12/2002 |

* cited by examiner

*Primary Examiner*—Kevin L Ellis
*Assistant Examiner*—Hashem Farrokh
(74) *Attorney, Agent, or Firm*—Dickstein, Shapiro, LLP.

(57) ABSTRACT

A multiprocessor system includes a plurality of processors that share a multiple-way set-associative cache memory that includes a directory and a data array, the multiprocessor system being partitioned such that the plurality of processor operate as independent systems. The multiprocessor system also includes a hit judgement circuit that determines hits of, of the ways in the sets that are designated at the time a processor of a particular partition accesses the shared cache memory, only those ways that have been allocated in advance in accordance with active signals that are supplied as output at the time of the access.

20 Claims, 6 Drawing Sheets

PREVENTION OF CONFLICTING CACHE HITS WITHOUT AN ATTENDANT INCREASE IN HARDWARE

BACKGROUND OF THE INVENTION

1. Field of the Invention

The present invention relates to a shared cache memory, and more particularly to a multiprocessor system and to a method of controlling hit determination of a shared cache memory in a multiprocessor system that includes a plurality of processors that share a multiple-way (n-way) set-associative cache memory that includes a directory and a data array, the multiprocessor system being partitioned such that the plurality of processors each operate as independent systems.

2. Description of the Related Art

In a multiprocessor system in which a plurality of processors share a cache, and moreover, in a multiprocessor system that has been partitioned to allow the plurality of systems to operate independently, each partition operates as an independent system (OS), and processors may therefore in some cases use the same address to refer to different memory sites.

Thus, when a different partition has registered a different memory block in the cache by the same address, a partition that refers to the cache at the same address may cause a conflicting cache hit.

An example of such a conflicting cache hit will be explained hereinbelow with reference to FIGS. 1A, 1B, 1C, and 1D. It is first assumed that the system is partitioned such that partition K1 is processor 0 and partition K2 is processor 1. Processor 1 (partition K2) sequentially supplies as output addresses X, Y, P, and Q in memory blocks A, B, C, and D, following which processor 0 (partition K1) sequentially supplies as output addresses R, Y, P in memory blocks E, F, and G. It is further assumed that each of the above-described blocks A-G are blocks in the same set i and that the cache memory is in the initial state.

When processor 1 (partition K2) supplies addresses X, Y, P, and Q in blocks A, B, C, and D, copies of blocks A, B, C, and D are stored in ways 0, 1, 2, and 3 of set i of data array 214 as shown in FIG. 1A.

The subsequent output of address R in block E by processor 0 (partition K1) results in a miss, and the copy of block A that was stored in way 0 is replaced by the copy of block E.

The subsequent sequential output from processor 0 of addresses Y and P in blocks F and G (the same addresses as blocks B and C) results in a cache hit at ways 1 and 2 that were registered by partition K2, as shown in FIGS. 1C and 1D, resulting in a conflicting cache hit.

As one example for preventing such a conflicting cache hit, Japanese Patent laid-open No. 2001-282617 discloses a case in which bits for storing partition numbers are extended on all cache tags, and a comparison circuit, when carrying out hit determination, determines partitions that are registered in the cache. As a result, cache hits are guaranteed not to occur in cache blocks that are registered in other partitions, and conflicting cache hits are therefore prevented.

However, a method in which bits are added to a cache tag and shared cache areas are allocated to each partition such as the aforementioned Japanese Patent No. 2001-282617 also entails an increase in the hardware construction. The above-described method is therefore problematic because it does not allow miniaturization of the shared cache, miniaturization of an on-chip multiprocessor system having a limited chip area, or a reduction in costs.

SUMMARY OF THE INVENTION

It is an object of the present invention to provide a multiprocessor system and a method of controlling hit determination for a shared cache memory of the type initially defined, this system having the same amount of hardware as a system of the prior art and being capable of preventing conflicting cache hits of each partition, and further, being capable of both reducing costs and allowing miniaturization of a shared cache or miniaturization of an on-chip multiprocessor system having a limited chip surface area.

According to a first aspect of the present invention hits of, of the ways in a set that have been designated at the time a processor of a particular partition accesses a shared cache memory, only those ways that have been allocated in advance in accordance with active signals that are supplied as output at the time of the access are determined.

According to a second aspect of the present invention, the multiprocessor system comprises a circuit for determining hits of, of the ways in a set that have been designated at the time of a processor of a particular partition accesses the shared cache memory, only those ways that have been allotted in advance in accordance with active signals that are supplied as output at the time of the access.

In a multiprocessor system that shares a cache among a plurality of processors and in which the multiprocessor system has been partitioned, allocating ways that correspond to each partition and removing from hit determination ways that are allocated to other partitions can prevent conflicting cache hits of each partition while using an amount of hardware that is equivalent to the prior art. This approach not only allows miniaturization of a shared cache or miniaturization of an on-chip multiprocessor system having a limited chip area, but also allows a reduction in cost.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1A:
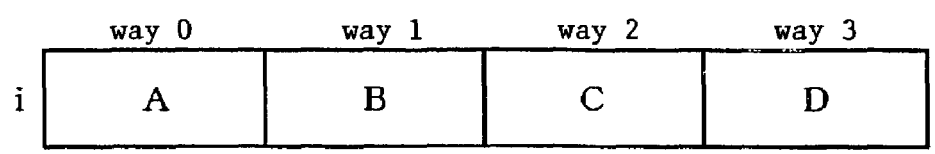
FIGS. 1A, 1B, 1C, and 1D are a view for explaining the operations of the prior art.
Figure 1B:
Figure 1C:
Figure 1D:
Figure 2:
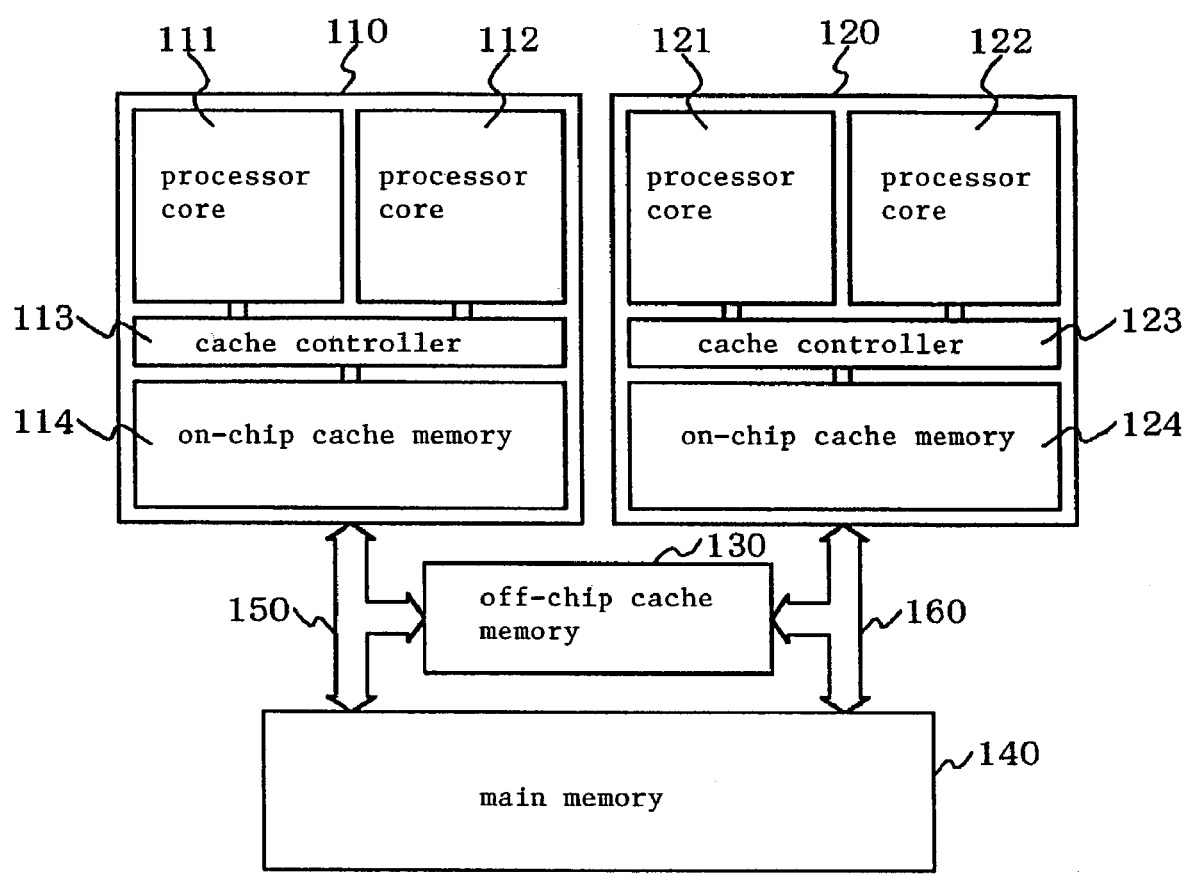
FIG. 2 is a block diagram showing the construction of an information processing system according to an embodiment of the present invention.

Referring now to FIG. 2, an information processing system according to an embodiment of the present invention includes on-chip multiprocessor system 110, on-chip multiprocessor system 120, off-chip cache memory 130, main memory 140, memory bus 150, and memory bus 160.

In the present embodiment, on-chip multiprocessor system 110 is divided into two systems, is in a state in which three systems operate including multiprocessor system 120, partition numbers being allocated such that partition K1 is allocated to processor core 111, partition K2 is allocated to processor core 112, and partition K3 is allocated to on-chip multi processor system 120.

On-chip multiprocessor system 110 comprises processor cores 111 and 112, cache controller 113, and on-chip cache memory 114. On-chip multiprocessor system 120 comprises processor cores 121 and 122, cache controller 123, and on-chip cache memory 124. On-chip cache memory 114 and on-chip cache memory 124 are four-way set-associative cache memories.

Figure 3:
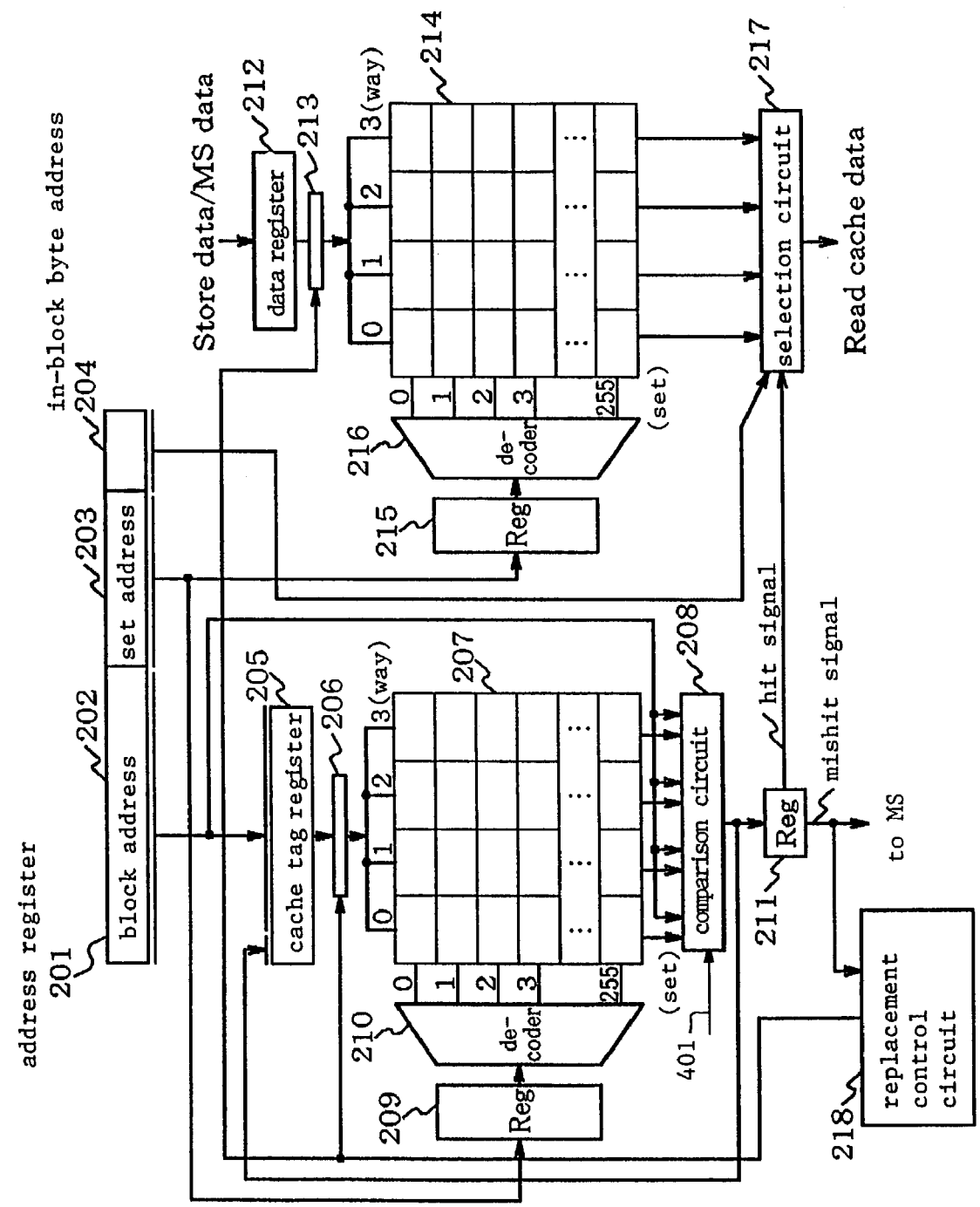
FIG. 3 is a block diagram showing an example of the construction of a cache controller and an on-chip cache memory.

FIG. 3 is a block diagram showing an example of the construction of cache controller 113 and on-chip cache memory 114 that are shown in FIG. 2. Cache controller 123 and on-chip cache memory 124 are of the same construction.

Address register 201 is a register for holding physical addresses (assumed to be 32-bit addresses) when processor cores 111 and 112 access main memory 140. These physical addresses are each composed of block address 202 (here assumed to be 18 bits), set address 203 (here assumed to be 8 bits), and in-block byte address 204 (here assumed to be 6 bits). The number of sets in directory 207 and data array 214 is therefore 256.

A copy of an appropriate block of main memory 140 is stored in each of the areas (4 ways×256 sets) of data array 214. Tags are stored in each of the areas (4 ways×256 sets) of directory 207, these tags being composed of: the block addresses of blocks for which copies are stored in corresponding areas of data array 214; and effective bits that indicate whether these copies are effective or not.

Register 209 is a register for holding set addresses 203. Decoder 210 decodes a set address that is held in register 209 and supplies as output a selection signal to select one of the 0th to the 255th sets of directory 207.

Register 215 is a register for holding set addresses 203. Decoder 216 decodes the set address that is held in register 215 and supplies as output a selection signal to select one of the 0th to the 255th sets of data array 214.

Figure 5:
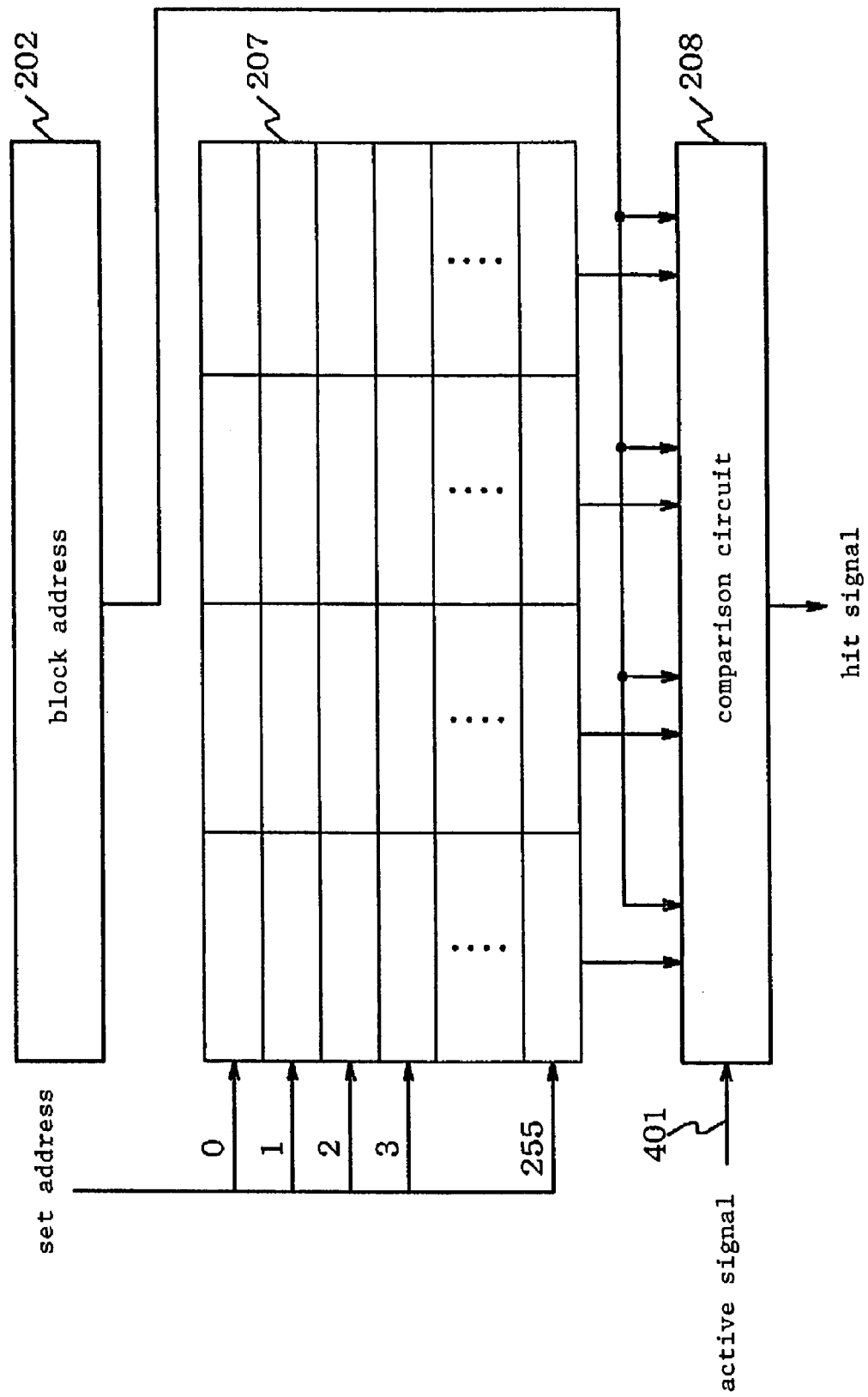
FIG. 5 is a block diagram for explaining input/output signals of the comparison circuit that is shown in FIG. 3.

As shown in FIG. 5, comparison circuit 208 receives as input: the content (tags) of the 0th to third ways in the sets that have been selected by decoder 210 from the 256 sets of directory 207, block addresses 202 that are held in address register 201, and active signals 401. Active signals 401 are two-bit signals and are supplied from memory elements such as registers when partition K1 or partition K2 accesses the memory. In this embodiment, the content of active signals 401 is the number of the partition that requested memory access, this number being "01" for partition K1 and "10" for partition K2.

Next, regarding the operation of comparison circuit 208 will be explained.

Operation when active signal 401 indicates partition K1:

Comparison circuit 208 compares block address 202 with the block addresses in the tag for which the effective bits of way 0 and way 1, which have been allocated to partition K1, indicates that they are effective; and supplies as output a miss signal if matching does not occur and a hit signal if matching does occur.

Operation when active signal 401 indicates partition K2:

Comparison circuit 208 compares block address 202 with block addresses in the tag for which the effective bits of way 2 and way 3, which have been allocated to partition K2, indicates that they are effective; and supplies as output a miss signal if matching does not occur and a hit signal if matching does occur.

Operation when active signal 401 indicates a non-partitioned state:

Comparison circuit 208 compares block address 202 with the block addresses in the tag for which the effective bits of way 0, way 1, way 2 and way 3 indicate that they are effective; supplies as output a miss signal if matching does not occur and a hit signal if matching does occur. In addition, the hit signal contains selection information indicating the way in which the matching block addresses are stored.

Register 211 is a register for holding hit signals and miss signals that are supplied as output from comparison circuit 208.

If a hit signal is supplied as output from comparison circuit 208, selection circuit 217 supplies the data that are stored in the area of data array 214 that is specified by the output of decoder 216 and the selection information that is contained within this hit signal.

When a miss occurs, cache tag register 205 holds the tag that is written to directory 207. Data register 212, on the other hand, holds a copy of the block that is written to data array 214 when a miss occurs.

When a miss signal is supplied as output from comparison circuit 208, replacement control circuit 218 supplies a replacement way signal that indicates the way that is the object of replacement. The details of the construction and operation of replacement control circuit 218 will be explained hereinbelow.

In accordance with a replacement way signal from replacement control circuit 218, selection circuit 206 supplies the tag that is being held in cache tag register 205 to, of the four ways of directory 207, the way that is indicated by the replacement way signal. Directory 207 writes the tag that has been supplied from selection circuit 206 to the area that is specified by the way that is the output destination and by the set that is selected by decoder 210 (the set in which the miss occurred).

Selection circuit 213, on the other hand, in accordance with the replacement way signal from replacement control circuit 218, supplies the copy of the block that is being held in data register 212 to, of the four ways of data array 214, the way that is indicated by the replacement way signal. Data array 214 writes the copy of the block that has been supplied from selection circuit 213 to the area that is specified by the way that is the output destination and the set that was selected by decoder 216 (the set in which the miss occurred).

Figure 4:
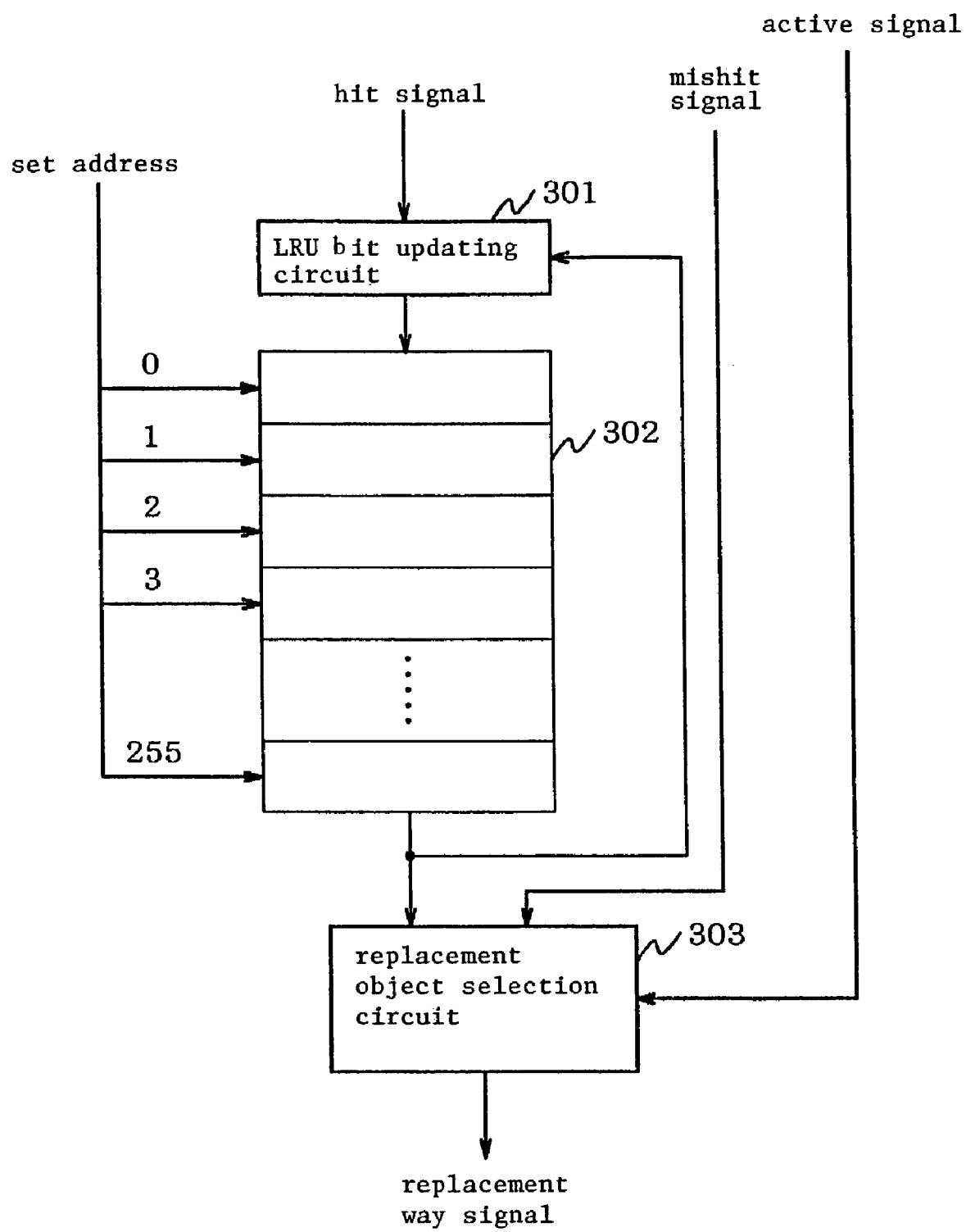
FIG. 4 is a block diagram showing an example of the construction of the replacement control circuit shown in FIG. 3.

FIG. 4 is a block diagram that shows an example of the construction of replacement control circuit 218 that is shown in FIG. 3. This replacement control circuit 218 comprises LRU bit updating circuit 301, LRU bit holding unit 302, and replacement object selection circuit 303.

LRU bit holding unit 302 consists of the 256 sets from the 0th to the 255th set, and in each set, LRU bits are stored that indicate the order of reference of the four ways within that set. In the present embodiment, LRU bits are composed of 8 bits with two bits being allocated to each of way 0, way 1, way 2 and way 3 in that order starting from the leading bit. The bits that correspond to each way are set to "00", "01", "10", and "11" in the order starting from the earliest reference.

When a hit signal is supplied as output from comparison circuit 208, LRU bit updating circuit 301 updates, of the LRU bits that are being held in LRU bit holding unit 302, the LRU bits in the set that is specified by set address 203.

The miss signal from comparison circuit 208, the output of LRU bit holding unit 302 (the content of the set that is selected by the set address), and the active signal are applied as input to replacement object selection circuit 303. Replacement object selection circuits 303 manage the four ways of directory 207 and data array 214 by dividing the ways into groups:

the ways for partition K1 (way 0 and way 1) and the ways for partition K2 (way 2 and way 3).

When a miss signal is supplied as output from comparison circuit 208, replacement object selection circuit 303 carries out the following operations based on the processor core that is indicated by the active signal (the processor core that performed the memory access that caused the miss).

Operations when the active signal indicates partition K1:

Of the LRU bits of 8-bit structure that are supplied from LRU bit holding unit 302, the bits that correspond to ways 0 and 1 that are group-allocated to partition K1 are compared (in the present embodiment, the 0th and first bits are compared with the second and third bits) to check which of the ways was consulted earliest. A replacement way signal that indicates the way that was consulted earliest is then generated and supplied as output. For example, if the bits that correspond to ways 0 and 1 are "00" and "10" respectively, a replacement way signal indicating way 0 is supplied. This replacement way signal is supplied to selection circuits 206 and 213 in FIG. 3.

Operations when the active signal indicates partition K2:

Of the LRU bits of 8-bit structure that are supplied from LRU bit holding unit 302, the bits that correspond to ways 2 and 3 that are group-allocated to partition K2 are compared (in the present embodiment, the fourth and fifth bits are compared with the sixth and seventh bits) to check which of the ways was consulted earliest. A replacement way signal that indicates the way that was consulted earliest is then generated and supplied as output.

Operations when the active signal indicates a non-partitioned state:

The LRU bits of 8-bit structure that are supplied as output from LRU bit holding unit 302 are compared to check which of the ways of way 0, way 1, way 2, and way 3 was consulted earliest. A replacement way signal that indicates the way that was consulted earliest is then generated and supplied as output.

The operation of the present embodiment will be described hereinbelow with reference to FIGS. 6A, 6B, 6C, and 6D.

As an example, processor core 111 now successively supplies addresses X and Y in blocks A and B; followed by processor core 112 which successively supplies addresses P, Q, and X in blocks C, D, and E; following which processor core 111 again successively supplies addresses X and Y in blocks A and B. It is here assumed that all of the above-described blocks A-E are blocks within the same set i, and that the cache memory is in the initial state.

Figure 6A:
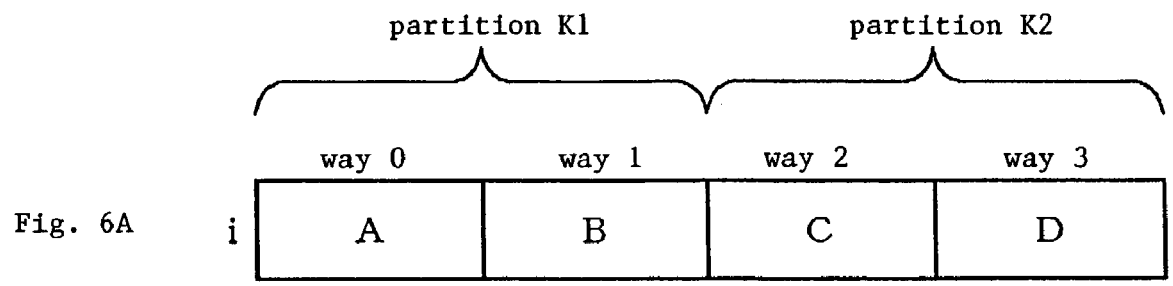
FIGS. 6A, 6B, 6C, and 6D are a view for explaining an example of the operation of the embodiment of FIG. 2.

Processor core 111 supplies addresses X and Y in blocks A and B, following which processor core 112 supplies addresses P and Q in blocks C and D, whereupon copies of blocks A, B, C, and D are stored in ways 0, 1, 2, and 3 of set i of data array 214 as shown in FIG. 6A.

Figure 6B:
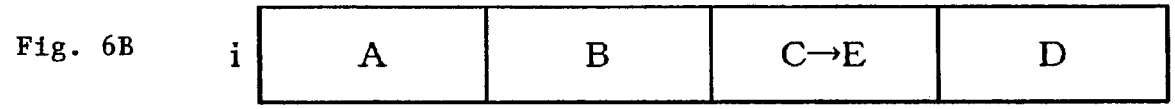

Processor core 112 then supplies address X (the same address as block A) in block E, whereupon a miss occurs because the ways for processor core 112 are limited to ways 2 and 3, and the copy of block C that was stored in way 2 is replaced by the copy of block E, as shown in FIG. 6B.

Figure 6C:
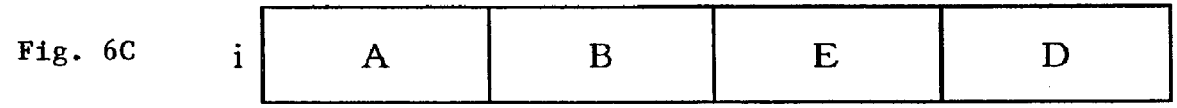
Figure 6D:
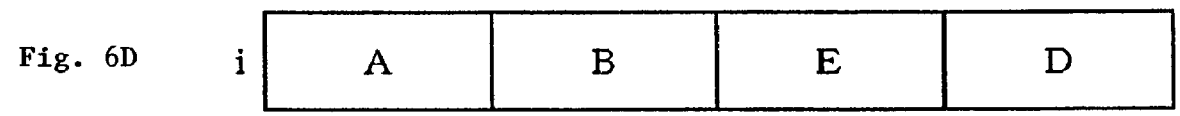

Despite the subsequent output from processor core 111 of addresses X and Y in blocks A and B, cache hits occur in ways 0 and 1 as shown in FIGS. 6C and 6D.

Although the number of processors sharing a cache is just two in the above-described embodiment, this number may be three or more. In addition, although the number of partitions of the parts that share the cache was just two in the above-described embodiment, this number may be three or more.

Finally, although the number of ways was four in the above-described embodiment, this number may be one, two, three, five, or more.

Although the cache described in the above-described embodiment was a primary cache, the cache may also be a lower-order cache. For example, this embodiment was applied to off-chip cache memory 130 shown in FIG. 2 (in which case, the number of partitions is three). In this embodiment, the active signal was information on the partitions, but the active signal may also be other information (for example, the processor number), and the logic of the corresponding hit determination circuit and replacement object selection circuit can also be applied to such a case.

While preferred embodiments of the present invention have been described using specific terms, such description is for illustrative purposes only, and it is to be understood that changes and variations may be made without departing from the spirit or scope of the following claims.

What is claimed is:

1. A method of controlling hit determination of a shared cache memory in a multiprocessor system that includes a plurality of processors, said shared cache memory being a multiple-way set-associative cache memory that contains a directory and a data array, said multiprocessor system being partitioned such that said plurality of processors each operate as independent systems, the method comprising:

allocating ways of said shared cache memory to respective partitions of said multiprocessor system, said shared cache memory not including an indication of said partitions, wherein said multiprocessor system allocates a region dedicated to respective partitions and a region common to said partitions; and determining hits of only said ways that have been allocated to said partition, by, after determining one set, selecting either the region dedicated to respective partitions or the region common to said partitions from the ways in said set, said determined set being unchanged even when the selection of a partition is changed each time the cache is accessed.

2. A method according to claim 1, wherein said partitioning is performed in units of operating systems (OS), wherein said operating system for each partition allocates a region dedicated to respective partitions and a region common to respective partitions to said shared memory.

3. A method according to claim 1, wherein said partitioning is carried out in units of processes.

4. A method according to claim 1, wherein:

when a miss occurs in said hit determination, said directory and said data array are updated for said way that has been rewritten earliest of said ways that have been allocated in accordance with active signals in said set.

5. A method according to claim 1 further comprising providing one or more active signals indicating the partitions, wherein said active signals are partition numbers of said partitions that have been partitioned, and said partition numbers are included in said active signals at the time of access from the region dedicated to respective partitions.

6. A method according to claim 1 further comprising providing one or more active signals indicating the partitions, wherein, when said active signals indicate a non-partitioned state, all said ways in said set become the object of hit determination, and information indicating that there are no partition numbers included in said active signals at the time of access from the region common to said partitions.

7. A method according to claim 1 further comprising providing one or more active signals indicating a partition when said partition accesses the shared cache memory.

8. A method according to claim 7, wherein said one or more active signals bypasses said shared cache memory.

9. A method according to claim 1 further comprising providing an active signal indicative of a partitioned or non-partitioned state.

10. A multiprocessor system comprising:
   a plurality of processors sharing a multiple-way set-associative cache memory that comprises a directory and a data array, said multiprocessor system being partitioned such that said plurality of processors operating as independent systems; and
   a circuit for determining hits of only said ways that have been allocated to said partitions wherein said shared cache memory do not include an indication of said partition, by, after determining one set, selecting either a region dedicated to respective partitions or a region common to said partitions from the ways in said set, said determined set being unchanged even when the selection of a partition is changed each time the cache is accessed.

11. A multiprocessor system according to claim 10, wherein said partitioning is carried out in units of operating systems (OS).

12. A multiprocessor system according to claim 10, wherein said partitioning is carried out in units of processes.

13. A multiprocessor system according to claim 10, further comprising:
   a replacement control circuit that, when a miss occurs in said hit determination, updates said directory and said data array for said way that has been rewritten earliest of said ways that have been allocated in accordance with active signals in said set.

14. A multiprocessor system according to claim 10, wherein said ways have been allocated to said partitions in accordance with active signals, and said active signals are partition numbers of said partitions that have been partitioned.

15. A multiprocessor system according to claim 10 further comprising active signals, wherein said comparison circuit takes as object of hit determination all said ways in said set when said active signals indicate a non-partitioned state.

16. A method according to claim 10, wherein said circuit receives active signals that are provided when respective partitions access the shared cache memory and are indicative of the respective partitions.

17. A method according to claim 16, wherein said active signals bypass the shared cache memory.

18. A multiprocessor system according to claim 10 further comprising an active signal indicative of a partitioned or non-partitioned state.

19. A method of controlling hit determination of a shared cache memory in a multiprocessor system comprising a plurality of processors, said plurality of processors sharing a multiple-way set-associative cache memory that contains a directory and a data array, said multiprocessor system being partitioned into a plurality of partitions such that said plurality of processors each operate as independent systems, the method comprising:
   allocating one or more ways of said shared cache memory to at least one of said plurality of partitions in advance of use of said shared cache memory wherein said multiprocessor system allocates a region dedicated to respective partitions and a region common to said partitions;
   generating an active signal when a particular partition accesses said shared cache memory, said active signal indicating said particular partition and bypassing the cache memory; and
   determining hits of only said ways that have been allocated to said particular partition indicated by said signal by selecting either a region dedicated to respective partitions or a region common to said partitions from the ways in said set, said determined set being unchanged even when the selection of a partition is changed each time the cache is accessed.

20. A method according to claim 19, wherein the active signal is indicative of a partitioned or non-partitioned state.

* * * * *